Nov. 14, 1933.        S. BALLANTINE        1,935,383
RECTIFIER ELEMENT
Filed Jan. 22, 1931        2 Sheets-Sheet 1
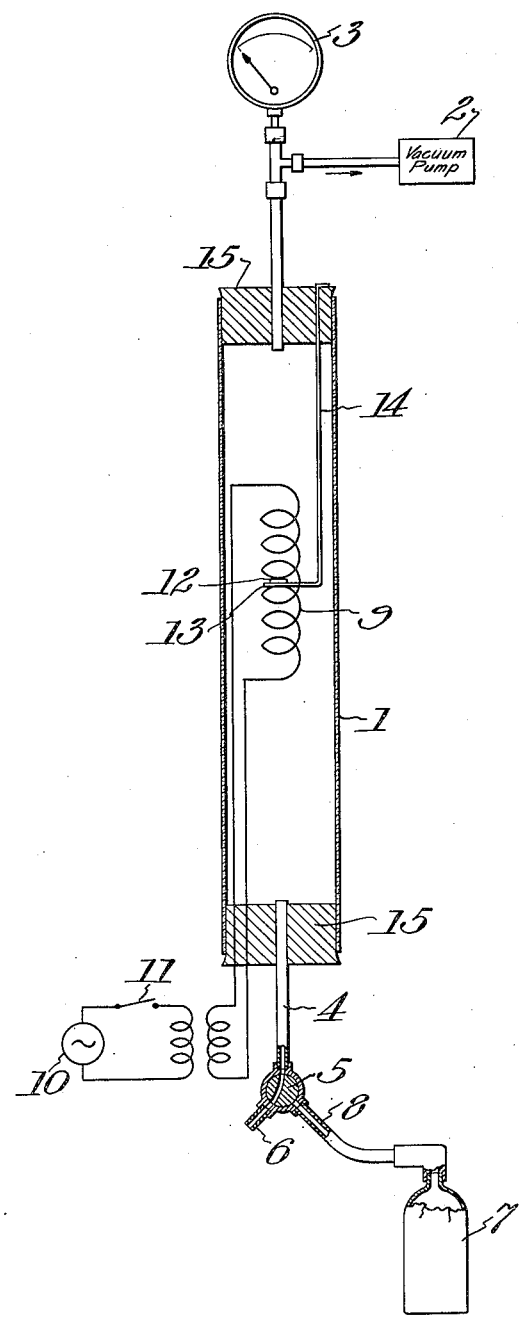
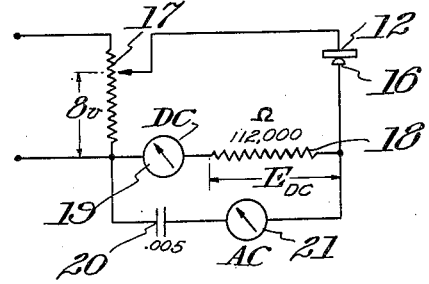
Inventor:
Stuart Ballantine,
By Byrnes Townsend & Potter,
Attorneys.

Nov. 14, 1933.    S. BALLANTINE    1,935,383
RECTIFIER ELEMENT
Filed Jan. 22, 1931    2 Sheets-Sheet 2

Patented Nov. 14, 1933

1,935,383

UNITED STATES PATENT OFFICE

1,935,383

RECTIFIER ELEMENT

Stuart Ballantine, Boonton, N. J., assignor, by mesne assignments, to Radio Corporation of America, New York, N. Y., a corporation of Delaware Application January 22, 1931. Serial No. 510,532

13 Claims. (Cl. 175—366)

This invention relates to rectifier elements and particularly to rectifier elements of the type employed for the rectification of high frequency currents.

It has been observed that the rectification efficiency of the so-called solid rectifiers is not constant for all frequencies. For example, rectifier units of the copper oxide type, i. e., copper in contact with a surface of cuprous oxide, may exhibit a high rectification efficiency at frequencies of the order of 60 cycles with materially lower efficiency at higher frequencies. In the demodulation of radio signals or the rectification of radio frequency currents for measurement by sensitive direct current ammeters, this frequency variation of rectification efficiency may be very disturbing as, for the same impressed voltage, the rectified output at 1500 kilocycles may be less than one-half the output at 100 kilocycles.

Without attempting to advance any theory in explanation of the results which I have obtained, I have discovered that the variation of rectification with frequency may be materially reduced by controlling the thickness of the cuprous oxide layer.

Objects of the invention are to provide rectifier elements which exhibit high rectification efficiency at high frequencies, and which exhibit a low variation of rectification with changes in the frequency of the applied alternating current. More particularly, an object is to provide a rectifier element of the metal-metallic oxide film type, in which the thickness of the film is of an order substantially lower than has been customary in the past. Further objects are to provide methods of manufacturing rectifier elements having exceedingly thin oxide film layers.

Figure 3:
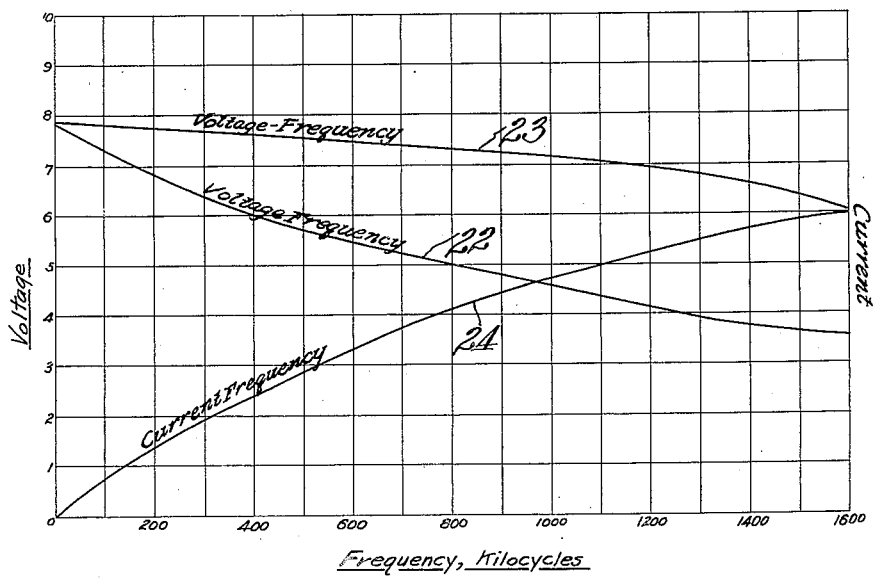
Figure 4:
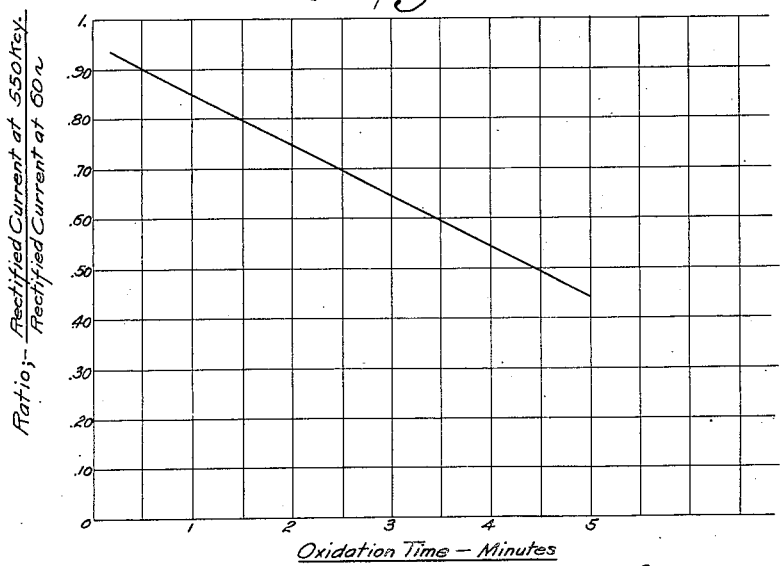

These and other objects of the invention will be apparent from the following specification, when taken with the accompanying drawings, in which:

Fig. 1 is a somewhat diagrammatic side elevation of one form of apparatus suitable for the production of rectifier elements embodying the invention, Fig. 2 is a circuit diagram of the apparatus employed for testing the rectification efficiency of the rectifier elements, Fig. 3 is a curve sheet showing, for the new and for the prior rectifiers, the frequency variation of rectification, and Fig. 4 is a curve sheet showing the general relationship between the thickness of the oxide film and the frequency-rectification characteristic of the rectifier elements.

According to the present invention, the relation between rectification efficiency and the frequency of the alternating current is determined by controlling the thickness of the oxide film constituting one element of a solid rectifier combination. As the thickness of the film is so small as to be difficult of exact measurement, the line of demarcation between the previously known rectifier elements and those embodying the present invention can best be expressed by reference to the properties of the rectifier elements and/or their method of manufacture.

A convenient form of apparatus for manufacturing the rectifier elements is shown diagrammatically in Fig. 1. A chamber 1 is connected to a vacuum pump 2 and a pressure gauge 3, and is provided with an inlet passage 4 which, by means of a valve 5 may be connected to atmosphere through a port 6 or to an oxygen tank 7 through a port 8. A heating coil 9 within the chamber 1 is energized by means of a suitable source 10 of electrical energy upon closure of a switch 11. The metal plate 12 upon which the oxide film is to be formed may be supported within the heating coil 9 by any appropriate structure and, in the apparatus as illustrated in Fig. 1, the support takes the form of a table 13 carried at the end of a rod or wire 14 which is mounted on one of the end closures 15 of the glass cylinder which constitutes the chamber 1.

According to one method of practicing the invention, the vacuum pump 2 is operated to reduce the pressure in chamber 1 to such magnitude that substantially no oxidation of the plate 12 will be effected when the latter is raised to such temperature that, in an oxidizing atmosphere, the exposed surfaces of the plate 12 would be oxidized. The valve 5 is then positioned to admit a limited quantity of air or of oxygen to the chamber 1 after the switch 11 is closed to heat the plate 12 to oxidizing temperature. After the heating of the plate 12 and the admission of a limited quantity of an oxidizing agency to establish a definite but relatively low pressure within the chamber 1 which is allowed to react for a controlled time, the pump 2 is again operated to reduce the pressure and the switch 11 is opened. When the temperature of the plate 12 falls below the point at which oxidation will take place, the pressure in chamber 1 is raised to atmospheric by opening valve 5 to atmosphere and the oxidized plate 12 is removed from the chamber.

As shown in Fig. 2, an appropriate circuit arrangement for testing the rectification efficiency of an asymmetric unit comprising the oxidized plate 12 and a metal contact 16 includes a voltage divider 17 across which the rectifier assembly is connected in series with a resistance 18 and a direct current milliammeter 19. In shunt with this direct current circuit is an alternating current branch comprising the condenser 20 and an alternating current ammeter 21.

A suitable source of radio frequency potential is connected across the terminals of the voltage divider 17 and, for all frequencies, the voltage impressed across the rectifier circuit may be adjusted to a predetermined value. The voltage of the rectified current may be determined from the observed reading of the milliammeter 19 and the known value of the resistor 18. As a check upon the observed readings of the rectified current, the magnitude of the alternating current passed by the rectifier system may be read from the alternating current ammeter 21.

The curves 22 and 23 of Fig. 3 show, respectively, the relation between rectification efficiency and frequency for copper oxide rectifiers now sold commercially and one manufactured in accordance with the invention. In both cases, the alternating current input was kept constant at 8 volts as the frequency was increased from 60 cycles to 1600 kilocycles. As shown by curve 22, substantially complete rectification was obtained with the commercial rectifier at 60 cycles as the measured output indicated a direct current potential of 7.85 volts across the output circuit. At 200 kilocycles, the rectified voltage had dropped below 7 volts, and at 1600 kilocycles the output was but slightly in excess of 3 volts. Curve 22 is typical of the performance of copper oxide rectifiers as previously manufactured, no specimens being found which retained as high as 50% rectification efficiency at frequencies above 1000 to 1200 kilocycles.

As shown by curve 23, the rectification efficiency of a rectifier employing an exceedingly thin cuprous oxide film remains approximately constant up to about 1000 kilocycles, and at 1600 kilocycles the output voltage was approximately 6.2.

Curve 24 of Fig. 3 shows the variation, with frequency, of the alternating current passed by the old type of rectifier, and demonstrates that the decrease in rectified voltage represented by curve 22 was due solely to the fact that the asymmetric conductivity decreased with increasing frequency.

That the decrease in rectification efficiency is a function of the thickness of the oxide layer is indicated by the curve of Fig. 4. Data for the curve was obtained by comparing the properties of a series of copper disks or pellets which had been oxidized for various periods ranging from a few seconds up to five minutes, under a reduced air pressure of 2.5 cm. of mercury. The ratio of the rectified current at 550 kilocycles to the rectified current at 60 cycles for the several specimens was then plotted against the oxidation time, and the curve of Fig. 4 indicates that the loss in rectification efficiency decreases with the thickness of the oxide film, i. e., the length of the oxidation period.

In forming the cuprous oxide layer on copper disks, the formation of copper oxide during the cooling is prevented by reducing the air pressure at the close of the heating operation, and permitting the oxidized disk to cool to approximately room temperature before opening the heating chamber to remove the oxidized disk.

It will be apparent that the invention is not restricted to the described process of and apparatus for controlling the thickness of the oxide layer. The essential feature is the provision of an appropriate control by which the oxidation is restricted to a very thin layer at the surface of the metal. Rectifier elements manufactured in accordance with the invention will exhibit a rectification efficiency, at 1000 kilocycles, of the order of in excess of 75% and at 1500, in excess of 50% of the retification efficiency at 60 cycles. Nor is it limited to a layer which is made initially thin. For example, copper oxide rectifiers have been produced by oxidizing copper disks and then reducing the surface of the oxide. In this case, the final thickness of the oxide layer can be determined by controlling the extent of reduction as well as the initial thickness of the oxide layer. Any suitable process of adjusting the final thickness of the layer so that it is thin enough to produce proper high frequency rectification falls within the scope of my invention.

I claim:

1. A rectifier element of the oxidized metal plate type, characterized by the fact that the thickness of the film layer is restricted to such magnitude that the rectification efficiency at 1000 kilocycles is not less than 75% of the efficiency at 60 cycles.

2. A rectifier element of the oxidized metal plate type, characterized by the fact that the thickness of the film layer is restricted to such magnitude that the rectification efficiency at 1500 kilocycles is not less than 50% of the efficiency at 60 cycles.

3. A rectifier element of the oxidized metal plate type, characterized by the fact that the thickness of the film layer is restricted to such magnitude that the rectification efficiency at 1000 kilocycles is not less than 75% of the efficiency at 60 cycles and at 1500 kilocycles is not less than 50% of the efficiency at 60 cycles.

4. A rectifier element of the cuprous oxide film type, characterized by the fact that the thickness of the film layer is restricted to such magnitude that the rectification efficiency at 1000 kilocycles is not less than 75% of the efficiency at 60 cycles.

5. A rectifier element of the cuprous oxide film type, characterized by the fact that the thickness of the film layer is restricted to such magnitude that the rectification efficiency at 1500 kilocycles is not less than 50% of the efficiency at 60 cycles.

6. A rectifier element of the cuprous oxide film type, characterized by the fact that the thickness of the film layer is restricted to such magnitude that the rectification efficiency at 1000 kilocycles is not less than 75% of the efficiency at 60 cycles and at 1500 kilocycles is not less than 50% of the efficiency at 60 cycles.

7. A rectifier element of the cuprous oxide film type substantially identical with one prepared by the hereindescribed process of heating a copper plate to oxidizing temperature in air at a pressure of 2.5 cm. and for a period not in excess of three minutes.

8. A rectifier element of the cuprous oxide film type substantially identical with one prepared by the hereindescribed process of heating a copper plate to oxidizing temperature in air at a pressure of 2.5 cm. and for a period not in excess of two minutes.

9. A rectifier element of the cuprous oxide film type substantially identical with one prepared by the hereindescribed process of heating a copper plate to oxidizing temperature in air at a pressure of 2.5 cm. and for a period not in excess of one minute.

10. In the manufacture of rectifier elements of the oxidized plate type, the method of determining the rectification-frequency characteristic of the element which comprises limiting the thickness of the oxide film by controlling the quantity of oxidizing agent and the length of oxidation period.

11. The method of manufacturing rectifier elements of the oxidized plate type, which comprises heating the plate to oxidizing temperature in the substantial absence of an oxidizing agent, contacting the heated plate with a limited quantity of an oxidizing agent, and cooling the oxidized plate below the oxidizing temperature.

12. In the manufacture of a rectifier element of the oxidized plate type, the process which comprises placing the plate in a chamber, exhausting air from the chamber to reduce the rate at which oxidation may be effected, and heating the plate to oxidizing temperature for a limited period.

13. In the manufacture of cuprous oxide rectifier elements, the method which comprises heating a copper plate in the presence of an oxidizing gas under reduced pressure, and limiting the oxidation time to form a cuprous oxide layer of such thickness that the property of asymmetric conductivity remains substantially uniform for all frequencies up to 1000 kilocycles.

STUART BALLANTINE.